US011372697B2

(12) United States Patent
Slik

(10) Patent No.: US 11,372,697 B2
(45) Date of Patent: Jun. 28, 2022

(54) MESSAGE BASED CODE EXECUTION USING KEY-VALUE STORAGE

(71) Applicant: NETAPP, INC., Sunnyvale, CA (US)

(72) Inventor: David Slik, Lasqueti Island (CA)

(73) Assignee: NETAPP, INC., San Jose, CA (US)

( * ) Notice: Subject to any disclaimer, the term of this patent is extended or adjusted under 35 U.S.C. 154(b) by 145 days.

(21) Appl. No.: 16/825,289

(22) Filed: Mar. 20, 2020

(65) Prior Publication Data

US 2021/0294674 A1    Sep. 23, 2021

(51) Int. Cl.
    *G06F 9/54*    (2006.01)
    *G06F 16/901*    (2019.01)

(52) U.S. Cl.
    CPC ............ *G06F 9/546* (2013.01); *G06F 16/901* (2019.01)

(58) Field of Classification Search
    None
    See application file for complete search history.

(56) References Cited

U.S. PATENT DOCUMENTS

| 8,250,090 | B2 | 8/2012 | Brignoli |
| 9,213,620 | B2 | 12/2015 | Bahlke et al. |
| 9,852,220 | B1 | 12/2017 | Guo et al. |
| 2004/0237067 | A1* | 11/2004 | Sun ........................ G06F 21/125 717/110 |
| 2012/0054197 | A1* | 3/2012 | San Martin ....... G06F 16/24554 707/747 |
| 2018/0026905 | A1* | 1/2018 | Balle ..................... G06F 3/0653 709/226 |
| 2018/0107467 | A1* | 4/2018 | Yang ................... G06F 9/45508 |
| 2019/0332522 | A1 | 10/2019 | Leydon et al. |
| 2020/0065163 | A1* | 2/2020 | Kavanagh ............... G06F 9/546 |

FOREIGN PATENT DOCUMENTS

CN    109587087 A    4/2019

OTHER PUBLICATIONS

Geambasu et al.; "Comet: An active distributed key-value store"; University of Washington; Oct. 2010; 14 pages.

* cited by examiner

*Primary Examiner* — Chat C Do
*Assistant Examiner* — William C Wood
(74) *Attorney, Agent, or Firm* — Klein, O'Neill & Singh, LLP

(57) ABSTRACT

Methods and systems for executing code are provided. A message with executable code is received by a processor that utilizes the message to generate a key associated with a value having executable code stored at a key-value store. The processor retrieves the value from the key-value store using the generated key. The processor then merges the executable code in the received message and the executable code in the retrieved value to generate a merged value for code execution.

20 Claims, 5 Drawing Sheets

MESSAGE BASED CODE EXECUTION USING KEY-VALUE STORAGE

TECHNICAL FIELD

The present disclosure relates to innovative computing technology, and more particularly, to a message based architecture for executing code.

BACKGROUND

Traditional computing system architectures separate computing resources from storage resources. Typically, computing resources of computing systems are connected to storage resources by a data communication bus. For executing computing tasks, computing resources retrieve stored data from storage resources using the data bus. The data bus may introduce latency and throughput limitations. For example, when the throughput of storage resources (i.e. the ability of storage resources to provide access to data) exceeds the throughput of the data bus (i.e. the ability of the data bus to transport data to and from the computing resources), there is an increase in latency in performing computing tasks because there is a delay in accessing stored data by the computing resources. This is an inefficient use of computing resources. Continuous efforts are being made to improve computing technology for efficiently executing code, especially for latency sensitive computations.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), flash memory or any other storage device type, in accordance with the claimed subject matter.

In one aspect, a computing node uses a message based architecture to perform latency sensitive computations by accessing a "key-value" storage system that stores structured data. Executable code and data can be stored as part of a "value" in the key-value storage system. A computing resource (for example, a processor) of the computing node receives a message with executable code. The computing resource uses the message to generate a key and then uses the key to retrieve a value from the key-value storage. The retrieved value includes executable code that is merged with the executable code in the received message. The merged value is then used by the computing resource to execute code. Details regarding the message based architecture are provided below.

Figure 1:
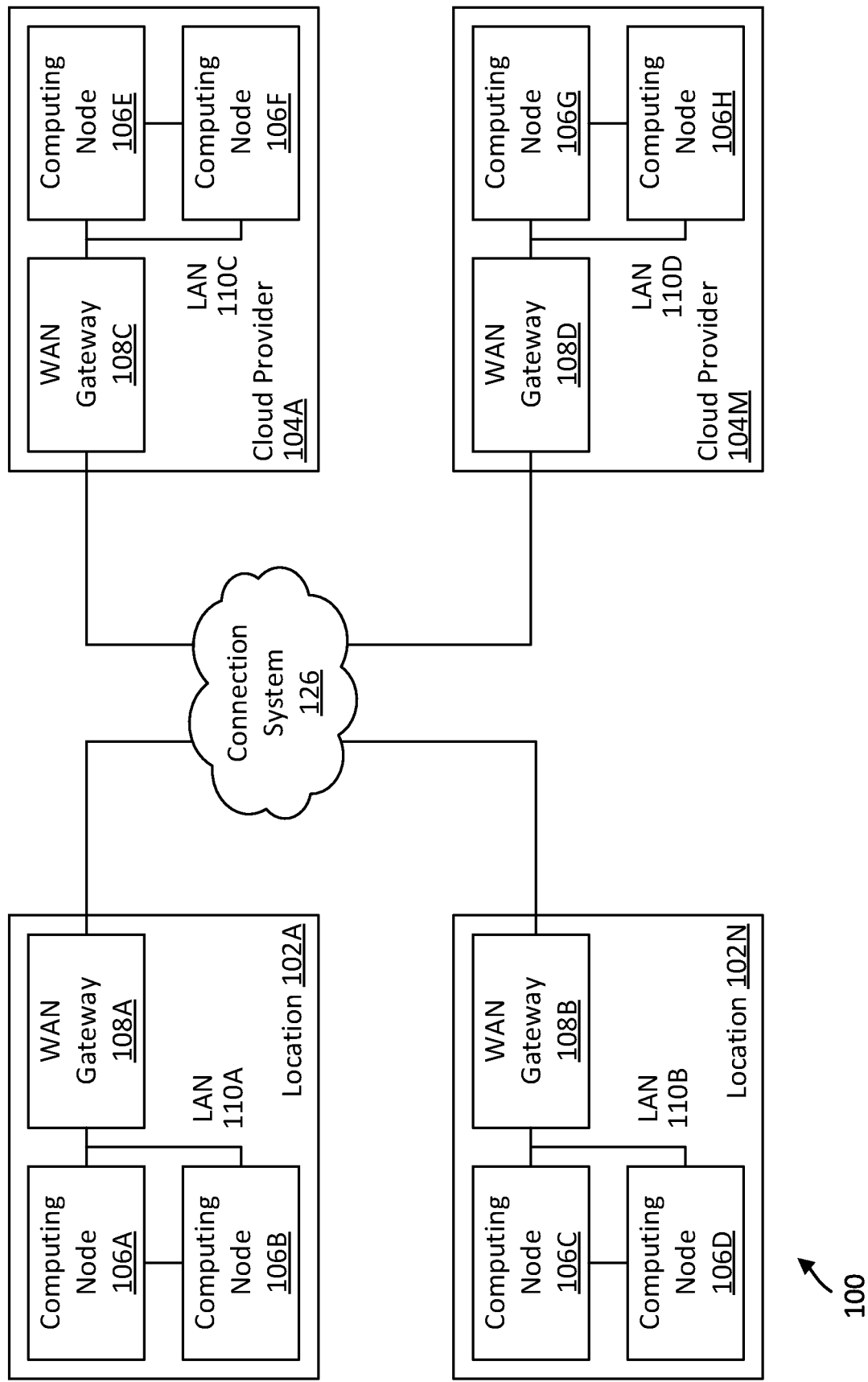
FIG. 1 shows a block diagram of a computing environment, used according to one aspect of the present disclosure.

System 100:

FIG. 1 shows an example of an operating environment 100 (also referred to as system 100) for using the innovative computing technology of the present disclosure. System 100 provides a distributed computing environment with multiple locations 102A-102N (may also be referred to as "location 102" or "locations 102") and cloud providers 104A-104M (may also be referred to as "cloud provider 104" or "cloud providers 104") connected via a connection system 126. The connection system 126 may use one or more network switches in a network including a local area network (LAN), wide area network (WAN), the Internet and others. It is noteworthy that although multiple locations are shown in FIG. 1, the various adaptive aspects of the present disclosure may be implemented in a single location with a computing node (may also be referred to interchangeably as a distributed computing node, distributed computing nodes, computing system, computing systems, server, servers, host system or host systems).

Each computing location 102 and the cloud providers 104 include a plurality of computing nodes 106A-106H (may also be referred to as computing node 106 or computing nodes 106). In one aspect, each computing node 106 operates as an integrated compute/storage resource that may be used to perform latency sensitive computations. The compute node 106 accesses key-value data (also referred to herein as "key-value pairs"), stored locally to perform latency sensitive computation. As long as latency within the computing node 106 is lower than the latency of an external data bus used to access stored data, there is improvement in overall efficiency of performing computational tasks as described below in detail.

In one aspect, the adaptive aspects described herein may leverage the non-volatile memory express (NVMe) specification/protocol to set, get or delete values associated with a key at a storage device that stores key-value pairs. The NVMe protocol is used to transport data over different media types. The NVMe protocol commonly uses the Peripheral Component Interconnect Express ("PCIe") protocol as the transport medium. NVMe provides a logical device interface specification that enables access to storage devices using a PCIe link. However, the various adaptive aspects of the present disclosure are not limited to NVMe or any other standard and/or proprietary protocol.

In one aspect, as shown in FIG. 1, a WAN gateway (e.g. 108A-108D, may also be referred to as "WAN 108" or "WANs 108") enables each location/cloud provider to access the connection system 126. A LAN (e.g. 110A-110D, also referred to as "LAN 110" or "LANs 110") may be deployed at each location to connect each computing node 106 to a LAN. It is noteworthy that the use of LAN/WANs are illustrative and are not intended to limit the various adaptive aspects of the present disclosure.

In one aspect, computing node 106 includes a virtual machine environment, where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

A virtual machine monitor (VMM), for example, a processor executed Hypervisor layer provided by VMWare Inc., Hyper-V layer provided by Microsoft Corporation (without derogation of any third party trademark rights) or any other layer type, presents and manages the plurality of guest OS. VMM may include or interface with a virtualization layer (VIL) that provides one or more virtualized hardware resource to each guest OS. For example, the VIL presents physical storage at storage devices as virtual storage (for example, as a virtual hard drive (VHD)) to VMs. The VMs use the VHDs to store information at storage systems.

In one aspect, the cloud provider 104 of FIG. 1 enables cloud computing. The cloud provider 104 includes a collection of computing nodes 106 for providing cloud based computing services. Cloud computing means computing capability that provides an abstraction between a computing resource and its underlying technical architecture (e.g., servers, storage, networks), enabling convenient, on-demand network access to a shared pool of configurable computing resources that can be rapidly provisioned and released with minimal management effort or service provider interaction.

In the cloud computing environment, storage space at a storage system is made available to clients by the cloud provider for storing information. Typically, the cloud provider licenses storage space to clients for storing and accessing data. The storage space may be used by one or more applications.

Figure 2A:
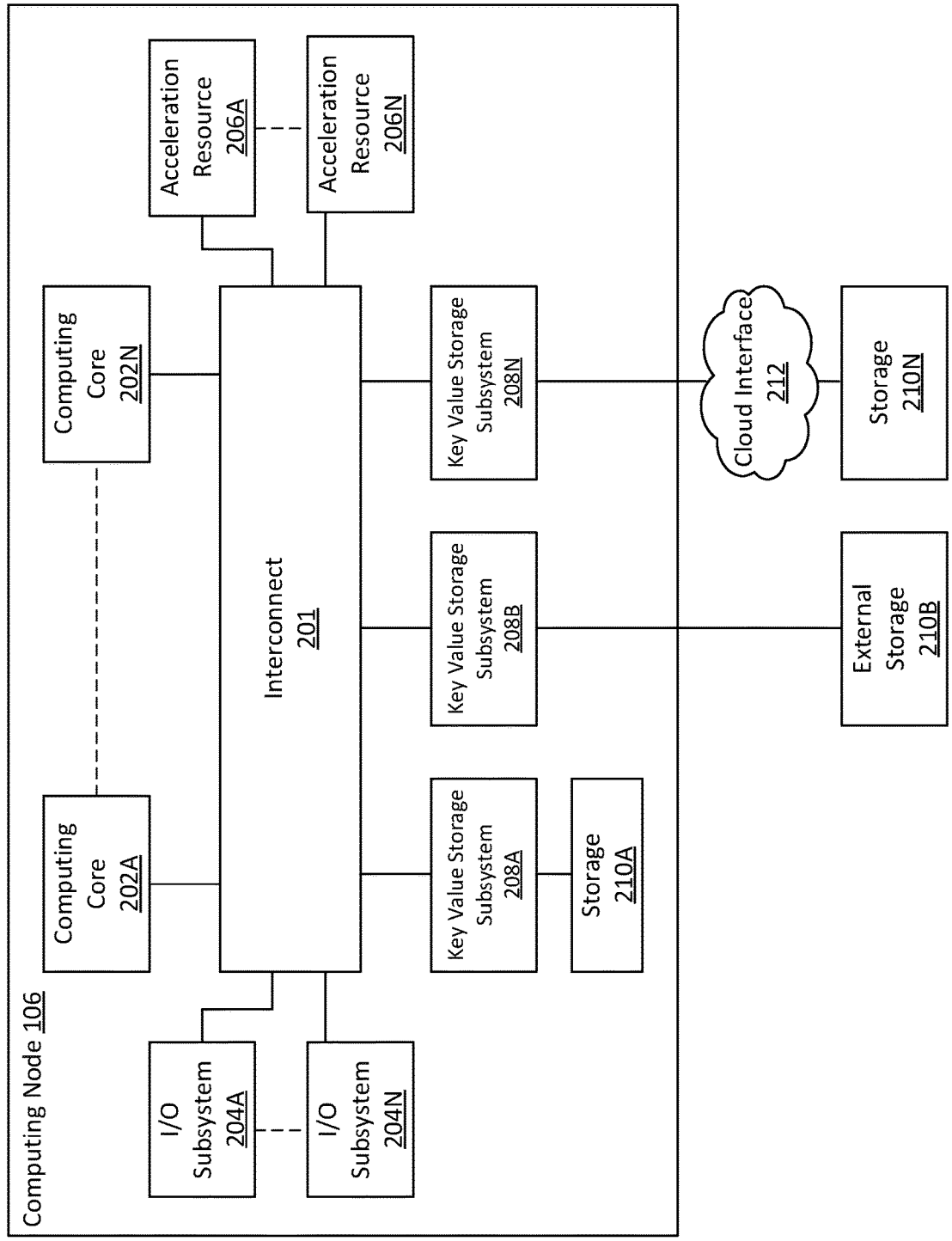
FIG. 2A shows an example of a computing node, according to one aspect of the present disclosure.

Computing Node 106:

FIG. 2A shows a block diagram of a computing node 106 having a plurality of computing cores 202A-202N (may also be referred to as "computing core 202" or "computing cores 202") with access to one or more storage systems 210A-210N (may also be referred to as "storage 210") via key-value storage sub-systems 208A-208N (may also be referred to as "key-value subsystem 208" or "key-value subsystems 208") and an interconnect 201. In one aspect, each computing core 201 includes one or more processors (e.g., 220 shown in FIG. 2B) and a memory (e.g. 222 shown in FIG. 2B) for executing code/instructions. It is noteworthy that although multiple computing cores 202 are shown in FIG. 2A, the adaptive aspects of the present disclosure can be implemented in a single, computing core node.

In one aspect, the interconnect 201 is an abstraction that represents one or more separate physical buses and/or point-to-point connections, connected by appropriate bridges, switches, cross-bar switches, fabrics, adapters and/or controllers. The interconnect 201 therefore may include, for example, a PCIe bus, a HyperTransport bus, an industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The examples of the present disclosure are described herein with respect to using PCIe, however, the various adaptive aspects of the present disclosure are not limited to PCIe or any other standard and/or proprietary bus system.

The storage devices of storage 210 may include writable storage device media such as solid state drives (including NVMe drives), hard drives, storage class memory (SCM), non-volatile random access memory (NVRAM), dynamic random access memory (DRAM), flash memory devices and any other media type adapted to store information. The various aspects disclosed herein are not limited to any particular storage device or storage device configuration.

In one aspect, the key-value subsystems 208 provide a hardware and software interface to access the underlying storage 210. As an example key-value subsystems 208 include an NVMe controller (not shown) that is used to interface with a computing core 202 to store and retrieve data stored as key-value pairs at storage 210. The software interface involves a storage driver (not shown) that is used to send and receive instructions.

As an example, storage 210A is local to computing cores 202 and accessible via the interconnect 201. In one aspect, storage 210A may include solid-state drives (SSDs), flash drives or any other storage media type accessible using the NVMe protocol defined by the NVMe specification. In another aspect, storage 210A may be accessible to any of the computing cores 202 via the interconnect 201. In one aspect, since storage 210A is local to the computing cores 202, the computing cores 202 are able to access executable code from a key-value pair stored at storage 210A with minimal delay and latency. This improves execution of latency sensitive computations.

Storage 210B is external to computing node 106 and may be managed by a storage operating system (not shown). The storage operating system functionally organizes the storage 210B by, inter alia, invoking storage operations in support of the storage service provided by storage 210B. A non-limiting example of the storage operating system is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this disclosure.

In one aspect, to facilitate access to storage devices at storage 210B, a storage operating system "virtualizes" the storage space provided by the storage devices. The storage 210B can present or export data stored at the storage devices as a storage volume or one or more qtree sub-volume units including LUNs. Each storage volume (or LUN) may be configured to store data containers or data objects (e.g. key-value pairs), scripts, executable programs, and any other type of structured or unstructured data. From the perspective of the VMs/computing systems, each volume can appear to be a single drive. However, each volume can represent the storage space in one drive, an aggregate of some or all of the storage space in multiple drives, a RAID group, or any other suitable set of storage space.

The storage 210B may be used to store and manage information at storage devices based on a request generated by a computing system (e.g. the computing node 106). The request may be based on file-based access protocols, for example, the CIFS or the NFS protocol, over TCP/IP. Alternatively, the request may use block-based access protocols, for example, iSCSI, FCP, an object based protocol or any other protocol. As an example, in a typical mode of operation, a computing system transmits one or more input/output (I/O) commands, such as an NFS or CIFS request to the storage 210B. Storage 210B receives the request, issues one or more I/O commands to storage devices to read or write the data on behalf of the computing system, and issues an NFS or CIFS response containing the requested data.

In another aspect, storage 210B may have a distributed architecture, for example, a cluster based system that may include a separate network module and storage module. Briefly, the network module is used to communicate with compute system nodes 106, while the storage module is used to communicate with the storage devices of storage 210B.

Storage 210N is accessible via a cloud interface 212. The cloud interface 212 enables computing node 106 to access storage 210N via point-to-point links, wide area networks, virtual private networks implemented over a public network (Internet) or a shared local area network using one or more switches. The cloud interface 212 includes the mechanical, electrical and signaling circuitry needed to connect the compute node 106 to storage 210N. The cloud interface 212 includes a network interface that may be an Ethernet adapter, a FC adapter, a Fibre Channel over Ethernet (FCoE) adapter, an InfiniBand adapter or any other adapter type.

Computing cores 202 can access acceleration resources 206A-206N (may also be referred to as "acceleration resource 206" or "acceleration resources 206") via interconnect 201. The acceleration resources 206 may include graphical processing units (GPUs), field programmable gate arrays (FPGAs) (for example, a FPGA based, offload engine for network protocol stack processing including TCP/IP (Transmission Control Protocol/Internet Protocol) protocol stack processing), specialized computing resources for performing specific computing tasks, or any other resources.

Computing node 106 also includes one or more input/output (I/O) subsystems 204A-204N (may also be referred to as "I/O subsystem 204" or "I/O subsystems 204") that are accessible to computing cores 202 via interconnect 201. The I/O subsystems 204 include both hardware and software (for example, adapter drivers and firmware) that enable the computing 106 node to send and receive messages from other computing nodes 106 and other devices, computers and peripherals external to System 100. For example, the I/O subsystems 204 include host bus adapters, converged network adapters and other similar devices that can be used to send and receive data, to and from computing nodes 106 and other devices, computers and peripherals external to System 100.

In one aspect, storage 210 stores structured data as "key-value" pairs. The structured data includes JSON (JavaScript Object Notation) data structures, CBOR (Concise Binary Object Representation) data structures, MXF (Material Exchange Format) objects, KLV (Key-length-Value) objects or data objects in any other format. Data and executable code (e.g. WebAssembly binary representation compiled using the programming language C or Rust) are stored in a "value" of a key-value pair, where each piece of data and code has a "name" or an identifier. The key-value pair is retrieved by the computing cores 202 using the appropriate key to execute code, as described below in detail.

Figure 2B:
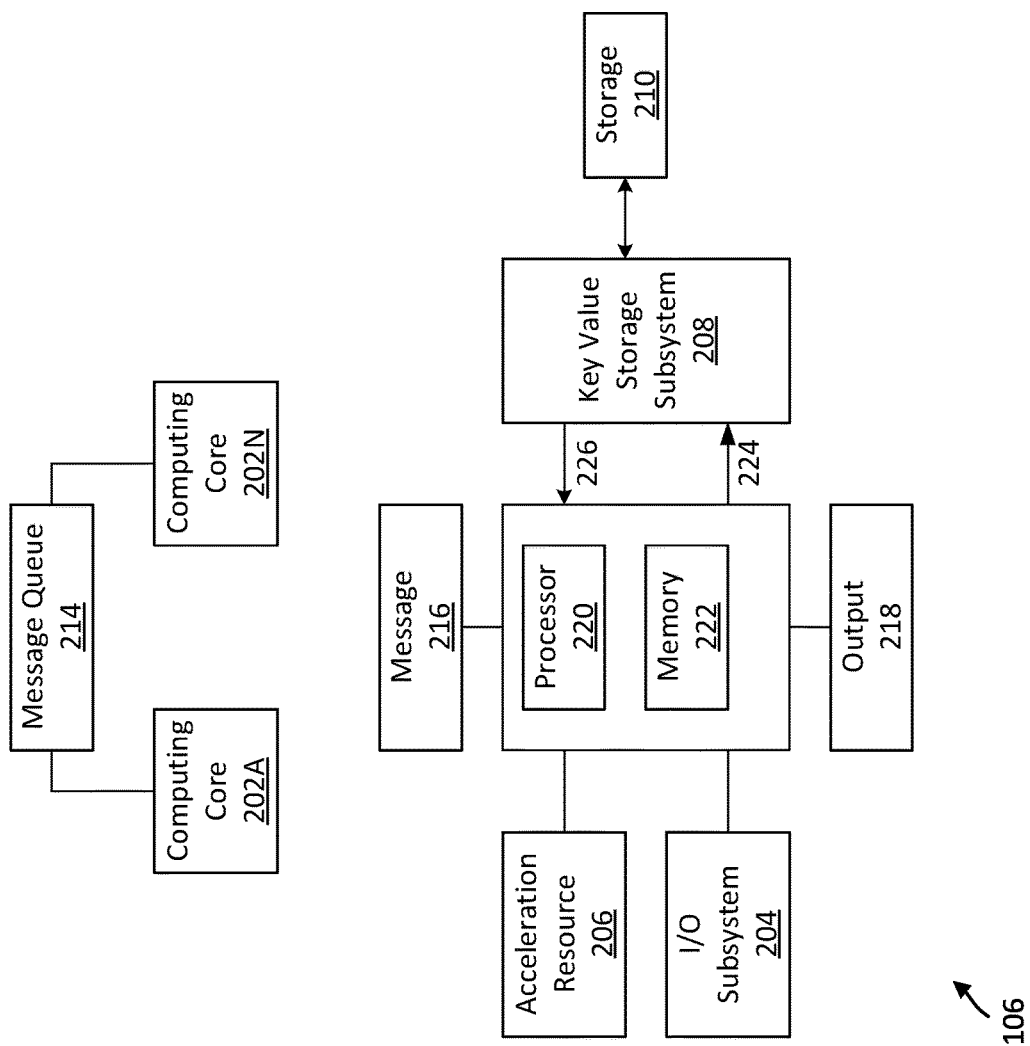
FIG. 2B shows an example of using a computing core of FIG. 2A for executing code, according to one aspect of the present disclosure.

FIG. 2B shows an example of a message-based architecture used by the computing node 106, according to one aspect of the present disclosure. At a high-level, the system of FIG. 2B receives a message with executable code, the message is stored at a message queue 214, and provided to a computing core 202. The computing core 202 uses the message to retrieve a value from storage 210 with executable code, merges the contents of the received message and the contents of the retrieved value, and then executes code contained in the merged value. The outcome of executing the code contained in the merged value is based on what is included in the received message as well as the retrieved value. For example, the computing core 202 may use the merged value code to access other values, alter an existing value, create a new value and/or generate another message for either a local computing resource of the computing node 106 or a remote computing node. It is noteworthy that the adaptive aspects of the present disclosure are not limited to any specific action that results from executing the merged value code.

In one aspect, as shown in FIG. 2B, the computing core 202 includes the processor 220 and the memory 222 that are connected via a bus system (not shown). As an example, the processor 220 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 222 represents any form of random access memory (RAM) including dynamic random access memory (DRAM), read-only memory (ROM), flash memory, or the like, or a combination of such devices.

In one aspect, a message 216 is retrieved from message queue 214 by the processor 220 and temporarily stored at the memory 222. The message 216 may include structured data, e.g. CBOR (Concise Binary Object Representation) objects. CBOR is a binary data serialization format, similar to JSON, and allows transmission of structured data objects containing zero or more pieces of data and code, where each piece of data and code has a "name" or an identifier. The message 216 may be received from any computing resource of computing node 106 or a remote computing node from a different location. When the message 216 is received from a remote computing node, then the message includes a unique identifier that identifies a destination node (i.e. the receiving computing node 106) that receives the message 216. In one aspect, message 216 can be named or unnamed.

An example of message 216 in a JSON format is as follows. The name of the message is shown as "myMessage". The message may optionally specify a method that is to be executed.

---
"myMessage" :{
    "value" : "some data",
    "method" : "<executable code >",
    "access count" : 2
---

Processor 220 generates a key 224 from the message 216 and provides the key 224 to the key-value subsystem 208. When message 216 is unnamed, then the computing core 202 may use a hash of the contents of the message to generate key 224. When message 216 is named, then the computing core 202 may use a hash of the message name to generate the key 224 to retrieve the value 226.

The key-value subsystem 208 uses key 224 to generate a query for storage 210 to retrieve the value 226 associated with the key 224. The value 226 may include structured data with executable code, e.g. Wasm code (binary or bytecode) that can be executed on a VM.

Processor 220 merges the retrieved value 226 and the message 216, including any executable code. If present, the merged code may be executed by the processor 220 that generates output 218.

When the message 216 includes executable code that matches a specified method, then the method specified by the message 216 is executed. When the message 216 does not include executable code for a specified method, but value 226 includes executable code for the specified method, then value 226 is used to execute the specified method.

The executed code may be used by the computing core 202 to access contents of another value, manipulate the contents of value 226, call other routines (not shown) contained within the message 216 and the value 226, create new messages or send a message to another computing core or another computing node 106.

Figure 3A:
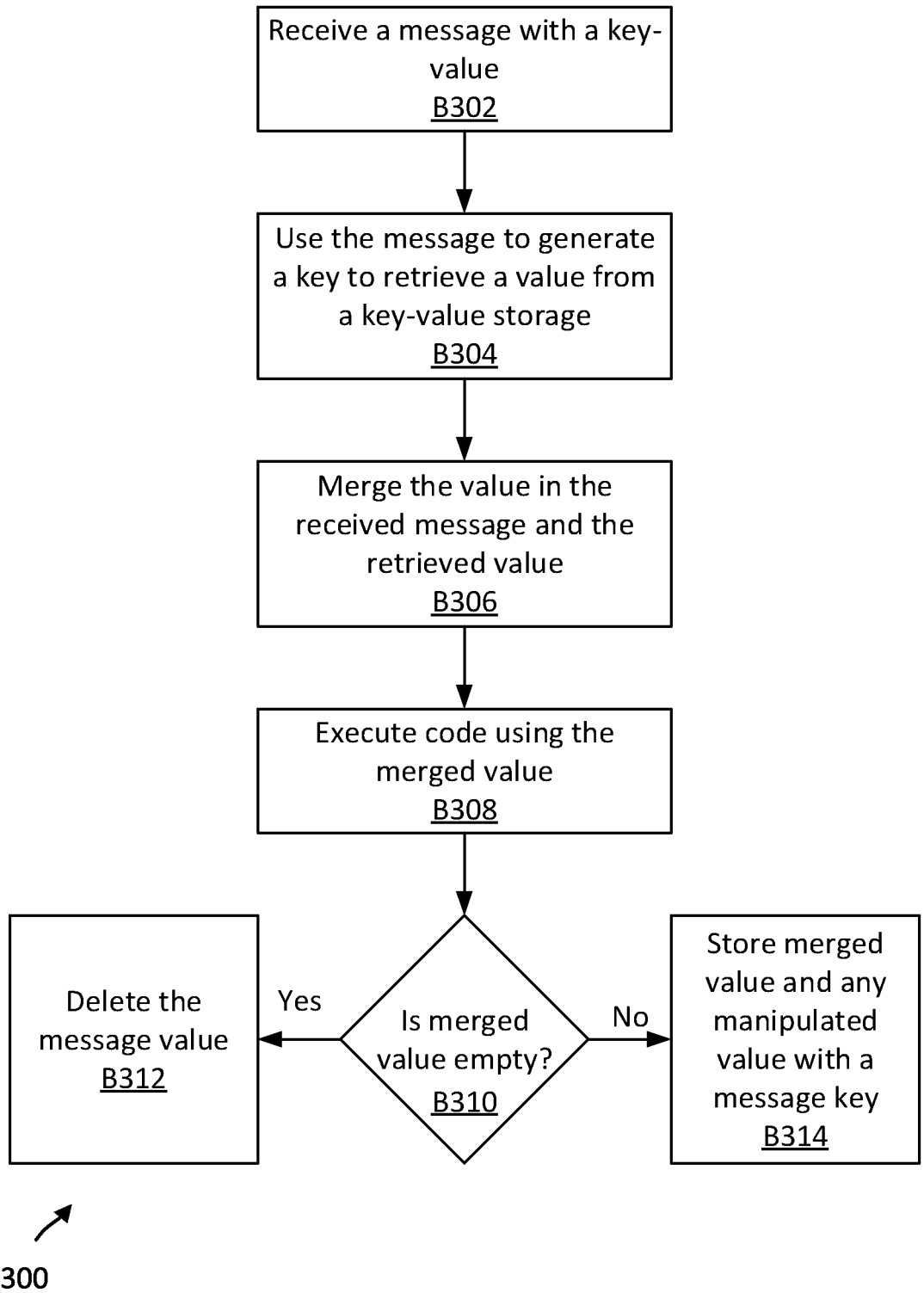
FIG. 3A shows a process flow of using a key-value storage for executing code, according to one aspect of the present disclosure.

Process Flows:

FIG. 3A shows a process 300 for using a value in message 216 and the retrieved value 226 by computing core 202, according to one aspect of the present disclosure. The various process blocks of FIG. 3A are described with respect to FIGS. 2A and 2B where computing core 202 has access to storage 210 including local storage 210A (shown in FIG. 2A) that improves code execution for latency sensitive computational tasks. Process 300 begins in block B302, when a message 216 is received for one of the computing cores 202. The message 216 is retrieved by one of the computing cores 202 from the message queue 214. In one aspect, the message 216 is configured as a "key-value" pair, with the value containing structured data, as described above.

In block B304, the processor 220 uses the message 216 to determine key 224. As mentioned above, the message 216 may be named or unnamed. For a named message, a hash of the name of the message may be used to generate key 224. For an unnamed message, the hash of the "value" within the message 216 may be used to generate key 224. In another aspect, the key 224 is embedded in message 216. The processor 202 provides the key 224 to the key-value storage sub-system 208. The key 224 may be specified within a "GET" request. The key-value storage sub-system 208 uses the key within the GET request to obtain a "value" associated with the key 224 from storage 210 (e.g. storage 210A, FIG. 2A, local to processor 202). The value 226 associated with key 224 is then provided to the processor 202.

In block B306, the retrieved value 226 and the value within the message 216 is merged. There are various options for merging the message value (i.e. the value in message 216) and the retrieved value 226. For example, the message value can be used to overwrite the retrieved value 226, the retrieved value 226 can be used to overwrite the message value, or both the message value and the retrieved value 226 can be used together.

In block B308, the executable code of the merged value from block B306 is executed by the processor 202. The executed code may be used to modify the merged value, generate another message for another computing core or another computing node, use an acceleration resource 206, and/or perform an I/O (input/output) operation using the I/O subsystem 204.

As an example, the acceleration resource 206 may be a network interface device (NIC) with a FPGA. The NIC handles establishing TCP/IP network connection sessions. The NIC sends each TCP/IP packet to the computing core 202 for a TCP/IP session as a "message" associated with the name of a "first message" (i.e. message 216) for processing a TCP/IP packet stream. The first message is retrieved by the computing core 202 and includes or is merged with executable code to process the TCP/IP packets and generate a response for a client that is sent via the FPGA NIC.

Upon code execution, in block B310, processor 202 determines if the merged value is "empty" i.e. null. If yes, then in block B312, the key 224 is used to remove value 226 from storage 210. If not, then in block B314, the merged value, and when applicable, the manipulated merged value, is stored at storage 210 using the key 224. The stored merged value may be used for another similar operation in the future.

Figure 3B:
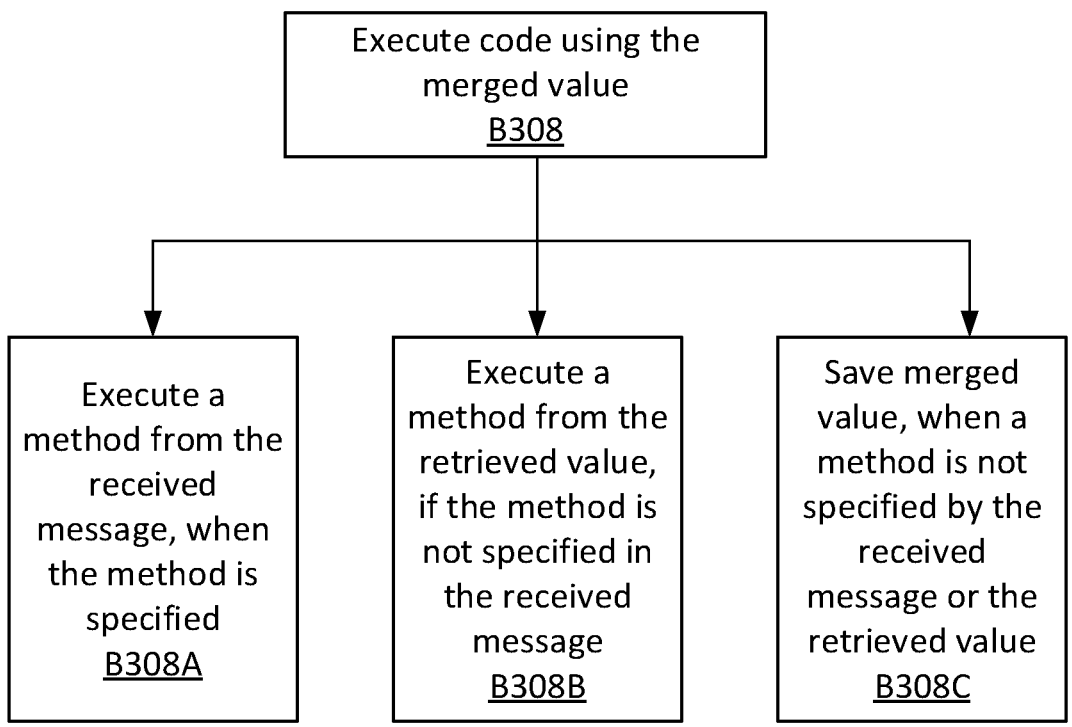
FIG. 3B shows an example of Block B308 of FIG. 3A, according to one aspect of the present disclosure.

FIG. 3B shows an example of process block B308 for executing code using the merged value generated from message 216 and the retrieved value 226, according to one aspect of the present disclosure. In block B308A, the processor 220 (as shown in FIG. 2B) executes a method that is specified in message 216. If a method is not specified in message 216, but specified in value 226, then in block B308B, the method specified in value 226 is executed. If the message 216 or the retrieved value 226 do not indicate a method for execution, then the merged value is saved with the key 224 without executing any code.

In one aspect, a method is provided. The method includes receiving by a processor (e.g. the processor 220 of FIG. 2B), a message (e.g. 216, FIG. 2B) with executable code (e.g. as shown in block B302, FIG. 3B); utilizing by the processor, the message to generate a key (e.g. 224, FIG. 2B) associated with a value having executable code stored at a key-value store (e.g. 210A of FIG. 2A, and also as shown in block B304, FIG. 3B); retrieving by the processor, the value from the key-value store, using the generated key (e.g. as shown in block B304, FIG. 3B); merging by the processor, the executable code in the received message and the executable code in the retrieved value to generate a merged value (e.g. as shown in block B306, FIG. 3B); and utilizing by the processor, the merged value to at least perform one of modifying the merged value, generating a message, using an acceleration resource, and performing an input/output operation (e.g. as shown in block B308, FIG. 3B).

In another aspect, a system is provided. The system includes a memory containing machine readable medium comprising machine executable code having stored thereon instructions; and a processor coupled to the memory to execute the machine executable code to: receive a message with executable code; utilize the message to generate a key associated with a value having executable code stored at a key-value store; generate a request using the key for retrieving the value from the key-value store; merge the executable code in the received message and the executable code in the retrieved value to generate a merged value; and utilize the merged value to perform an action.

In yet another aspect, a non-transitory machine-readable storage medium having stored thereon instructions for performing a method is provided. The machine executable code which when executed by at least one machine, causes the machine to: receive a message with executable code; utilize the message to generate a key associated with a value having executable code stored at a key-value store; generate a request using the key for retrieving the value from the key-value store; merge the executable code in the received message and the executable code in the retrieved value to generate a merged value; and utilize the merged value to perform an action.

In one aspect, the innovative technology disclosed herein is necessarily rooted in computing technology. The disclosed computing technology improves how computing resources can be located "close" to key-value stores and then use a message based architecture to efficiently execute code. This enables a computing and storage resource to execute code faster than conventional systems reducing latency.

Thus, a method and apparatus for executing code have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
receiving, by a processor, a message having a first executable code;
generating, by the processor, a key from a name of the message, when the message is named, and using message content to generate the key, when the message is unnamed, wherein the key is associated with a value stored at a key-value store, the value including a second executable code;
retrieving, by the processor, the value from the key-value store, using the generated key;
merging, by the processor, the retrieved value and the message to generate a merged value, the merged value including the first executable code and the second executable code; and
executing, by the processor, the first and the second executable code of the merged value using a method specified by the retrieved value, when the method is not specified by the message; and based on the execution, utilizing, by the processor, an acceleration resource to perform a computing function; wherein the acceleration resource is a network device that sends the message to the processor and transmits a network packet after the processor executes the first and the second executable code.

2. The method of claim 1, further comprising: utilizing, by the processor, the first and the second executable code of merged value to execute an input/output operation to read and write data from a storage device.

3. The method of claim 1, further comprising: utilizing, by the processor, the first and second executable code for modifying the merged value.

4. The method of claim 1, further comprising: generating, by the processor, based on the first and the second executable code of the merged value, a message for a computing node remote to the processor.

5. The method of claim 3, further comprising: storing, by the processor, the modified merged value associated with the key at the key-value store.

6. The method of claim 1, further comprising: executing, by the processor, the first and the second executable code of the merged value using a method specified by the message.

7. The method of claim 1, further comprising: offloading, by the processor, the computing function to the acceleration resource coupled to the processor via a peripheral link.

8. A non-transitory machine-readable storage medium having stored thereon instructions for performing a method, comprising machine executable code which when executed by at least one machine, causes the machine to:
receive a message having a first executable code;
generate a key from a name of the message, when the message is named, and using message content to generate the key, when the message is unnamed, wherein the key is associated with a value stored at a key-value store, the value including a second executable code;
generate a request using the key for retrieving the value from the key-value store;
merge the first executable code and the second executable code in the retrieved value to generate a merged value; and
execute the first and the second executable code of the merged value using a method specified by the retrieved value, when the method is not specified by the message; and based on the execution, perform an action; wherein the action is performed by a network device that transmits a network packet after the processor executes the first and the second executable code.

9. The non-transitory machine-readable storage medium of claim 8, wherein the machine executable code upon execution, further causes the machine to: modify the merged value.

10. The non-transitory machine-readable storage medium of claim 8, wherein the machine executable code upon execution, further causes the machine to: utilize the merged value to generate a message for a computing node.

11. The non-transitory machine-readable storage medium of claim 9, wherein the machine executable code upon execution, further causes the machine to: store the modified merged value at the key-value store with the key.

12. The non-transitory machine-readable storage medium of claim 8, wherein the machine executable code upon execution, further causes the machine to: execute the first and the second executable code of the merged value using a method specified by the message.

13. The non-transitory machine-readable storage medium of claim 8, wherein the machine executable code upon execution, further causes the machine to: utilize the merged value to use an acceleration resource for executing a computing task.

14. The non-transitory machine-readable storage medium of claim 8, wherein the machine executable code upon execution, further causes the machine to: utilize the merged value to perform an input/output operation.

15. A system, comprising:
a memory containing machine readable medium comprising machine executable code having stored thereon instructions; and a processor coupled to the memory to execute the machine executable code to:
receive a message having a first executable code;
generate a key from a name of the message, when the message is named, and using message content to generate the key, when the message is unnamed, wherein the key is associated with a value stored at a key-value store, the value including a second executable code;
generate a request using the key for retrieving the value from the key-value store;
merge the first executable code and the second executable code in the retrieved value to generate a merged value; and
execute the first and the second executable code of the merged value using a method specified by the retrieved value, when the method is not specified by the message; and based on the execution, perform an action; wherein the action is performed by a network device that transmits a network packet after the processor executes the first and the second executable code.

16. The system of claim 15, wherein the processor further causes the machine executable code to: modify the merged value, and store the modified merged value at the key-value store with the key.

17. The system of claim 15, wherein the processor further causes the machine executable code to: utilize the merged value to generate a message for a computing node.

18. The system of claim 15, wherein the processor further causes the machine executable code to: utilize the merged value to perform an input/output operation.

19. The system of claim 15, wherein the processor further causes the machine executable code to: execute the first and the second executable code of the merged value using a method specified by the message.

20. The system of claim 15, wherein the processor further causes the machine executable code to: utilize the merged value to use an acceleration resource for executing a computing task.

* * * * *